(12) United States Patent
Yu et al.

(10) Patent No.: US 8,605,340 B2
(45) Date of Patent: Dec. 10, 2013

(54) SCANNER (75) Inventors: An-Chi Yu, Hsin-Chu (TW);
Kuang-Hui Tsai, Hsin-Chu (TW);
Shih-Lung Tseng, Hsin-Chu (TW);
Hui-Zong Chen, Hsin-Chu (TW)

(73) Assignee: Mustek Systems Inc., Hsin-Chu (TW)

( * ) Notice: Subject to any disclaimer, the term of this patent is extended or adjusted under 35 U.S.C. 154(b) by 265 days.

(21) Appl. No.: 13/241,931

(22) Filed: Sep. 23, 2011

(65) Prior Publication Data
US 2013/0033730 A1 Feb. 7, 2013

(30) Foreign Application Priority Data

Aug. 1, 2011 (CN) .......................... 2011 1 0217791

(51) Int. Cl.
*H04N 1/40* (2006.01)
*G06F 3/042* (2006.01)
*H04N 1/04* (2006.01)

(52) U.S. Cl.
USPC ............ 358/474; 358/475; 358/444; 345/175

(58) Field of Classification Search
USPC ........................... 358/474, 475, 444; 345/175
See application file for complete search history.

(56) References Cited

U.S. PATENT DOCUMENTS

| 6,587,099 | B2* | 7/2003 | Takekawa ..................... 345/175 |
| 6,608,619 | B2* | 8/2003 | Omura et al. ................. 345/175 |
| 7,154,642 | B2* | 12/2006 | Lichtfuss ...................... 358/497 |
| 2002/0075525 | A1* | 6/2002 | Lichtfuss ...................... 358/475 |
| 2003/0006973 | A1* | 1/2003 | Omura et al. ................. 345/175 |
| 2012/0307316 | A1* | 12/2012 | De Muelenaere et al. .... 358/444 |

* cited by examiner

*Primary Examiner* — Charlotte M Baker
*Assistant Examiner* — Rury Gisham
(74) *Attorney, Agent, or Firm* — Ladas & Parry, LLP (57) ABSTRACT

A scanner for an electronic device having image display functionality includes lower and upper housings, a scan unit, and an adaptor. The lower housing is formed on opposite sides with a paper inlet and a paper outlet. The upper housing is mounted on the lower housing, and includes a main body provided with a terminal hole, and a support member disposed proximate to the terminal hole and to abut against the electronic device when the electronic device is connected to the scanner. The scan unit includes a scan module disposed between the lower and upper housings, a control module coupled to the scan module, and a connecting terminal coupled to the control module and accessible via the terminal hole. The adaptor is removably mounted to the connecting terminal so as to permit direct electrical connection between the scanner and the electronic device.

11 Claims, 14 Drawing Sheets

SCANNER

CROSS-REFERENCE TO RELATED APPLICATION

This application claims priority of Chinese Application No. 201110217791.X, filed on Aug. 1, 2011.

BACKGROUND OF THE INVENTION

1. Field of the Invention

The invention relates to a scanner, more particularly to a scanner to be connected to an electronic device without requiring a connecting cable or a wire 2. Description of the Related Art A conventional scanner includes a housing and a scan unit disposed in the housing. The housing has a paper inlet and a paper outlet at opposite sides thereof. The scan unit includes a scan module, a control module coupled electrically to the scan module, and a memory coupled electrically to the control module.

During use, a sheet of to-be-scanned paper enters the scanner through the paper inlet so as to pass through the scan module for conducting an image scan, and exits the scanner through the paper outlet after the image scan is complete. Image data generated as a result of the image scan is stored in the memory, and can be accessed by a computing device coupled electrically to the scanner.

However, the conventional scanner can only be connected to a computing device via a connecting cable or a wire.

SUMMARY OF THE INVENTION

Therefore, the object of the present invention is to provide a scanner adapted to be directly connected to an electronic device having image display functionality.

According to the present invention, there is provided a scanner that includes a lower housing, an upper housing, a scan unit, and an adaptor. The lower housing is formed on opposite sides with a paper inlet and a paper outlet. The upper housing is mounted on the lower housing, and includes a main body that is provided with a terminal hole and a support member that is disposed proximate to the terminal hole and that is adapted to abut against the electronic device when the electronic device is connected to the scanner. The scan unit includes a scan module disposed between the lower and upper housings, a control module coupled electrically to the scan module, and a connecting terminal coupled electrically to the control module and accessible via the terminal hole. The adaptor is removably mounted to the connecting terminal so as to permit direct electrical connection between the scanner and the electronic device such that the scanner may operate under control of the electronic device.

Preferably, the main body of the upper housing includes an upper wall disposed on an upper edge of the lower housing, and a recess wall extending concavely from the upper wall. The terminal hole is formed in the recess wall.

Preferably, the control module includes a computing chip coupled electrically to the scan module, and an internal memory coupled electrically to the computing chip.

Preferably, the scan module further includes a universal serial bus (USB) socket connected to the computing chip for permitting electrical connection between the scanner and the electronic device via a USB connector, and a power supply module coupled electrically to the computing chip, the USB socket and the connecting terminal.

Preferably, the power supply module includes a first voltage converter coupled electrically to the computing chip and the USB socket, and a second voltage converter coupled electrically between the connecting terminal and the first voltage converter.

Preferably, the recess wall of the main body of the upper housing includes a side portion extending downwardly from the upper wall, and a bottom portion connected to a lower end of the side portion and formed with the terminal hole. The upper housing further includes a cover plate mounted pivotally to the side portion of the recess wall for cooperatively defining a dustproof space with the recess wall when the cover plate is pivoted to cover the bottom portion of the recess wall.

Preferably, the support member is connected to the cover plate opposite to the pivotal connection with the side portion of the recess wall, defines cooperatively the dustproof space with the cover plate and the recess wall, and is adapted to support the electronic device when the cover plate is pivoted to uncover the bottom portion of the recess wall.

Preferably, the upper housing further includes a slide member connected to the support member, and the upper wall of the main body of the upper housing includes an inclined portion proximate to the recess wall and a sliding groove portion provided in the inclined wall for accommodating movable extension of the slide member therein.

Preferably, the upper wall of the main body of the upper housing further includes upper and lower groove-defining wall portions cooperatively defining the sliding groove portion. The slide member includes a main body portion that is connected at one side to the support member, a resilient unit that abuts resiliently against another side of the main body portion opposite to the support member, and a guide track that is formed in the main body portion. The upper wall of the main body of the upper housing further includes a guide member that is disposed on the lower groove-defining wall portion and that is received movably in the guide track for limiting the movable extension of the slide member in the sliding groove portion.

Preferably, the upper wall of the main body of the upper housing further includes two insert poles extending at the another side of the main body portion away from the support member, and the resilient unit includes two spring members respectively sleeved on the insert poles and abutting resiliently against the another side of the main body portion.

Preferably, the upper groove-defining wall portion has an insert hole. The guide member has a first insert portion received in the insert hole, a second insert portion received movably in the guide track, and a connecting portion connecting the first and second insert portions and disposed in slidable contact with the lower groove-defining wall portion.

The effect achieved by the present invention lies in that, with the provision of the connecting terminal and the adaptor, a portable electronic device with image display functionality may be directly connected to the scanner for controlling operation of the scanner and for viewing of the scanned image data with ease and convenience.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
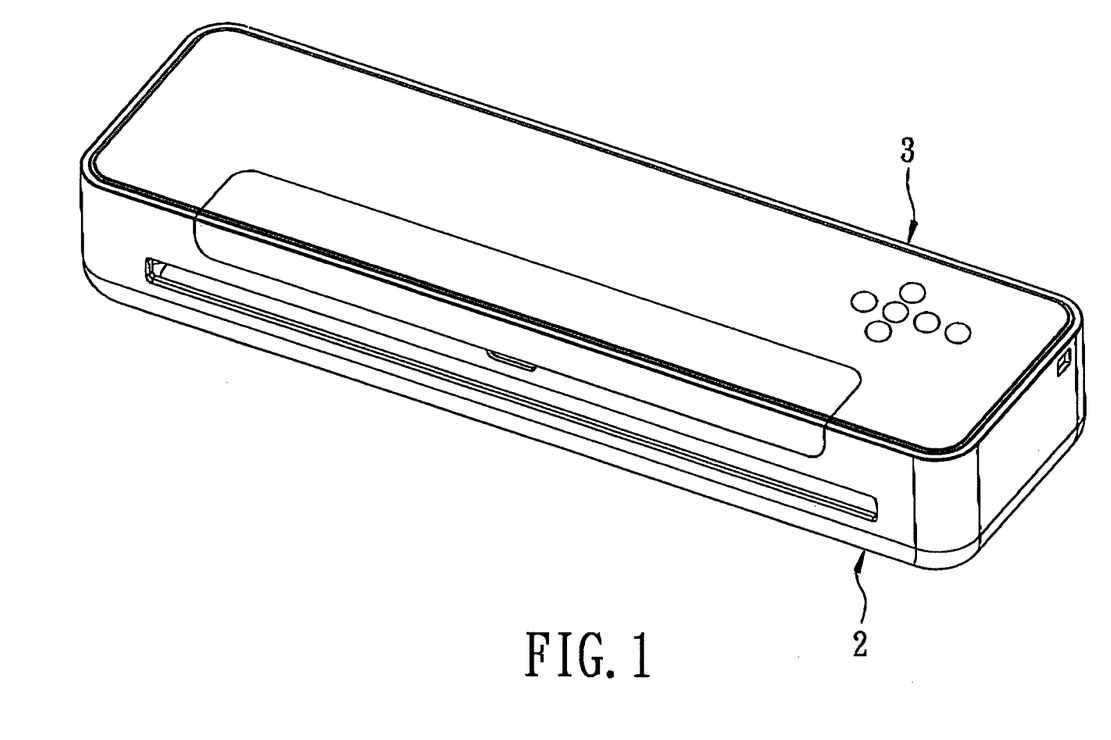
FIG. 1 is a perspective view of the first preferred embodiment of a scanner according to the present invention when assembled.
Figure 2:
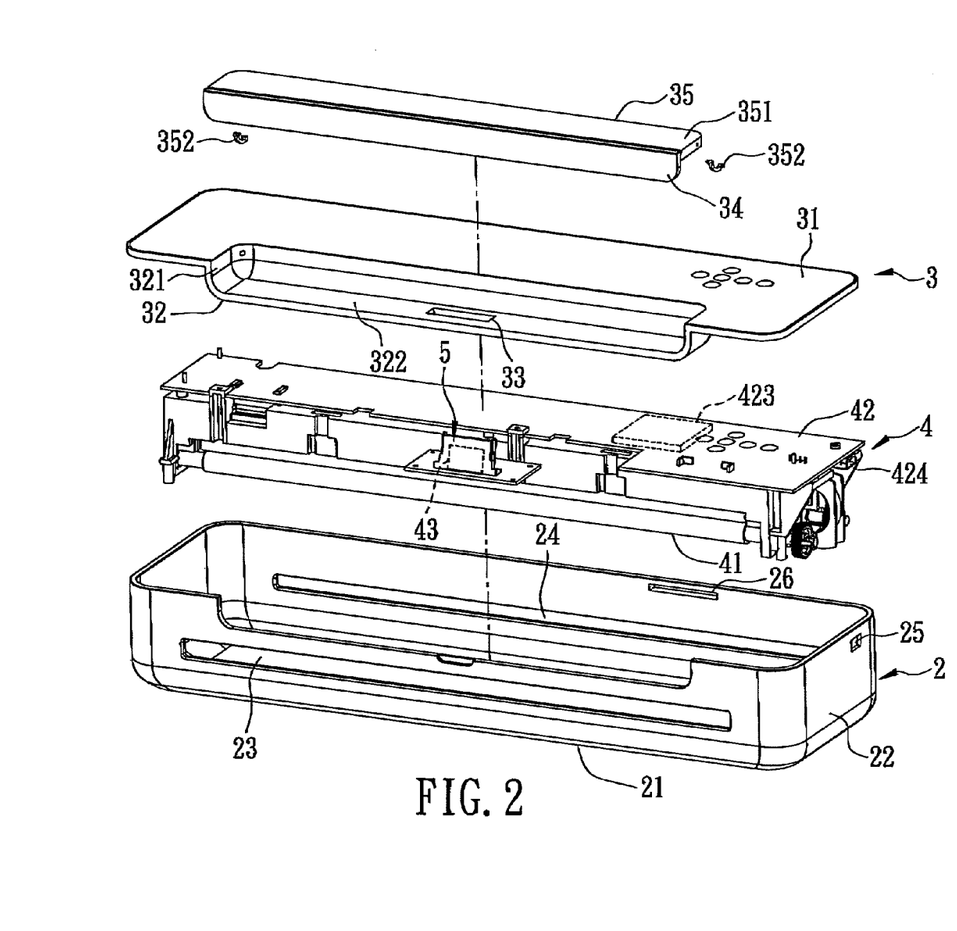
FIG. 2 is a partly exploded perspective view of the first preferred embodiment.
Figure 5:
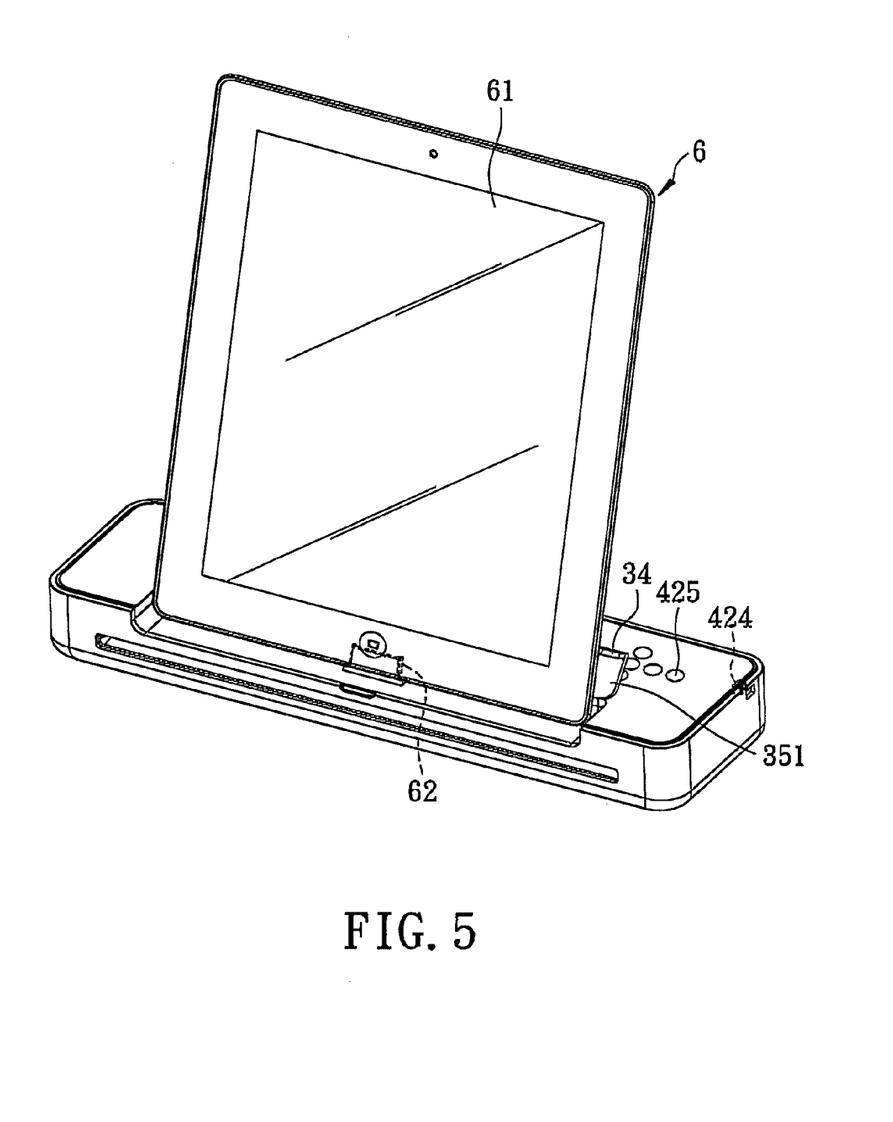
FIG. 5 is a perspective view of the scanner when connected to an electronic device according to the first preferred embodiment.

With reference to FIG. 1, FIG. 2 and FIG. 5, the first preferred embodiment of a scanner according to the present invention is adapted to be directly connected to an electronic device 6 having image display functionality. The electronic device 6 includes a display panel 61, a computing module (not shown) coupled electrically to the display panel 61, and a connecting socket 62 coupled electrically to the computing module. The scanner includes a lower housing 2, an upper housing 3, a scan module 4, and an adaptor 5. In this embodiment, the electronic device 6 is a tablet computer and the display panel 61 is a touch control display panel. However, it should be noted herein that the electronic device 6 may also be a mobile phone or a personal digital assistant (PDA) in other embodiments of the present invention.

Figure 3:
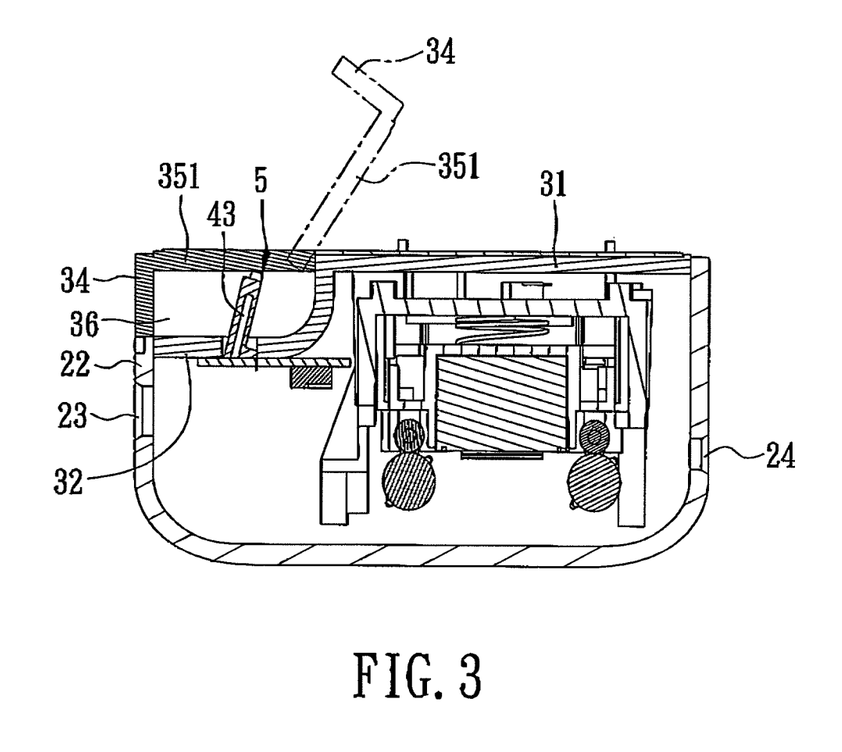
FIG. 3 is a sectional view of the first preferred embodiment, illustrating a base portion of a cover plate pivotable between a dustproof position and a supporting position.

Referring to FIG. 2, FIG. 3 and FIG. 5, the lower housing 2 includes a bottom wall 21, and a side wall 22 that surrounds and that extends upwardly from the bottom wall 21. The lower housing 2 is formed in opposite sides of the side wall 22 with a paper inlet 23 and a paper outlet 24. The lower housing 2 is further formed with a through hole 25 and an insert hole 26 in the side wall 22.

The upper housing 3 is mounted on the lower housing 3, and includes a main body including an upper wall 31 that is disposed on an upper edge of the side wall 22 of the lower housing 2, and a recess wall 32 that extends concavely from the upper wall 31, and that is provided with a terminal hole 33, which is formed in the recess wall 32 in this embodiment. The upper housing 3 further includes a support member 34 that is disposed proximate to the terminal hole 33, and that is adapted to abut against the electronic device 6 when the electronic device 6 is connected to the scanner, and a cover plate 35 that is mounted pivotally to the recess wall 32.

The recess wall 32 includes a side portion 321 extending downwardly from the upper wall 31, and a bottom portion 322 connected to a lower end of the side portion 321 and formed with the terminal hole 33.

The cover plate 35 is mounted pivotally to the side portion 321 of the recess wall 32 for cooperatively defining a dustproof space 36 with the recess wall 32 when the cover plate 35 is pivoted to cover the bottom portion 322 of the recess wall 32. The cover plate 35 includes a base portion 351 disposed proximate to the side portion 321 of the recess wall 32, and two pivot members 352 connected pivotally between the base portion 351 of the cover plate 35 and the side portion 321 of the recess wall 32.

In this embodiment, the support member 34 is connected to the base portion 351 of the cover plate 35 opposite to the pivotal connection with the side portion 321 of the recess wall 32, defines cooperatively the dustproof space 36 with the cover plate 35 and the recess wall 32, and is adapted to support the electronic device 6 when the cover plate 35 is pivoted to uncover the bottom portion 322 of the recess wall 32.

Figure 6:
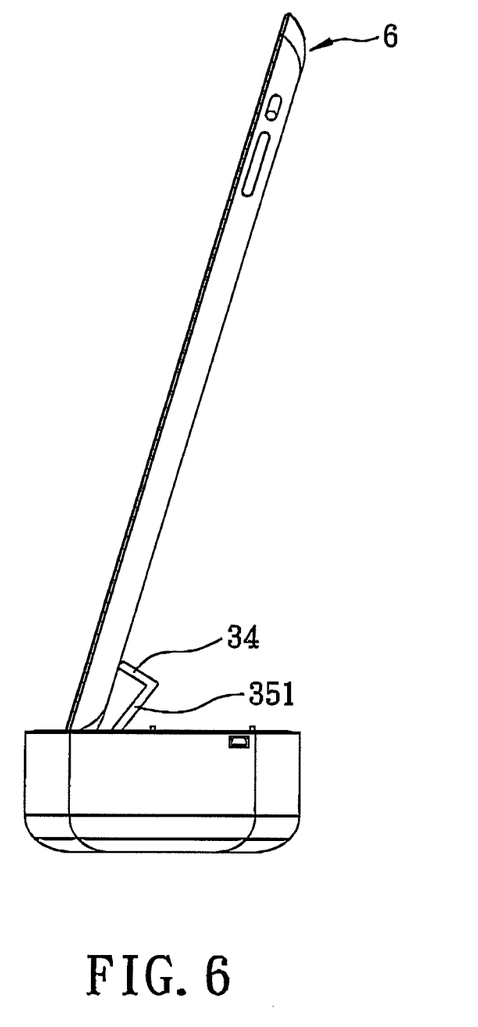
FIG. 6 is a side view of the scanner when connected to the electronic device according to the first preferred embodiment.

The base portion 351 of the cover plate 35, along with the support member 34, is pivotable relative to the recess wall 32 between a dustproof position and a supporting position. As shown in FIG. 3 by the solid lines, when disposed at the dustproof position, the base portion 351 of the cover plate 35 is pivoted to be flush with the upper wall 31, while the support member 34 that is connected to the base portion 351 abuts against the side wall 22 so as to define cooperatively the dustproof space 36. As shown in FIG. 3 by the imaginary lines, when disposed at the supporting position, the base portion 351 of the cover plate 35 is pivoted to lean against the upper wall 31, bringing the support member 34 to be disposed above the recess wall 32 to serve as a support for the electronic device 6 when the electronic device 6 is connected directly to the scanner (as shown in FIG. 5 and FIG. 6).

Figure 4:
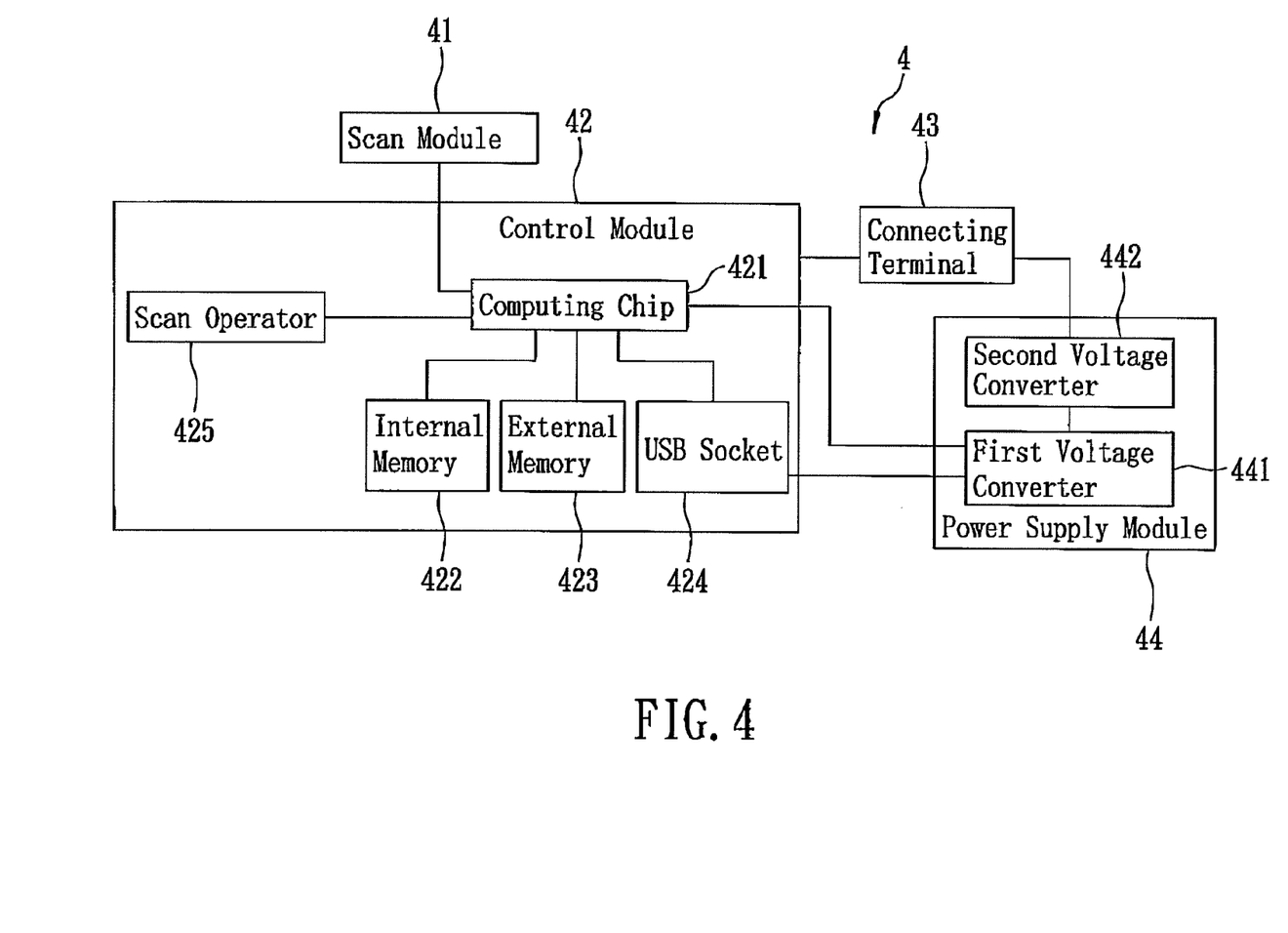
FIG. 4 is a block diagram, illustrating a scan unit of the scanner according to the first preferred embodiment.

Referring to FIG. 2, FIG. 4 and FIG. 5, the scan unit 4 includes a scan module 41 disposed between the lower and upper housings 2, 3, a control module 42 coupled electrically to the scan module 41, a connecting terminal 43 coupled electrically to the control module 42 and accessible via the terminal hole 33 in the lower housing 3, and a power supply module 44 coupled electrically to the control module 42 and the connecting terminal 43.

The control module 42 includes a computing chip 421 coupled electrically to the scan module 41, an internal memory 422 coupled electrically to the computing chip 421, an external memory 423 coupled electrically and removably to the computing chip 421 via the insert hole 26 that is formed in the side wall 22 of the lower housing 2, a universal serial bus (USB) socket 424 connected to the computing chip 421 and disposed to correspond to the through hole 25 for permitting electrical connection between the scanner and another electronic device via a USB connector and/or for receiving external power through a USB connector, and a scan operator 425 (e.g., a button or a switch) coupled electrically to the computing chip 421. In this embodiment, the external memory 423 may be an SD memory card.

Further, in this embodiment, the power supply module 44 is coupled electrically to the computing chip 421, the USB socket 424 of the control module 42 and the connecting terminal 43, and includes a first voltage converter 441 coupled electrically to the computing chip 421 and the USB socket 424, and a second voltage converter 442 coupled electrically between the connecting terminal 43 and the first voltage converter 441. The first voltage converter 441 is adapted for converting an external voltage received through the USB socket 424 into a stable power for supply to the computing chip 421, and the second voltage converter 442 supplies the stable power from the first voltage converter 441 to the connecting terminal 43 after another power conversion.

Referring to FIG. 2, FIG. 3 and FIG. 5, the adaptor 5 is disposed in the dustproof space 36, and is removably mounted to the connecting terminal 43 so as to permit direct electrical connection between the scanner and the electronic device 6 via the connecting socket 62 such that the scanner may operate under control of the electronic device 6 and such that scanned data may be displayed on the display panel 61 of the electronic device 6. In this embodiment, the adaptor 5 is designed to be coupled directly to a tablet computer, such as an iPad®, but it may also be designed to be suitable for connecting multiple types of electronic devices 6 in other embodiments of the present invention.

With reference to FIG. 2, FIG. 3 and FIG. 4, the base portion 351 of the cover plate 35, along with the support member 34, is pivoted to the dustproof position so as to provide dustproof protection to the adaptor 5 that is disposed in the dustproof space 36. At this time, the scanner can be connected to a computing device (not shown) through the USB socket 424 via a USB cable, such that power may be received from the computing device by the power supply module 44 for driving operation of the computing chip 421 of the control module 42. When the scan operator 425 is operated, scan operation by the scanner may begin, with the scanned data selectively stored in the internal memory 422 and the external memory 423. The scanned data may also be transmitted via the USB cable to the computing device for use thereby.

When the USE socket 424 is connected to an external power supply via a USB cable, the scanner may store the scanned data in the external memory 423 for subsequent retrieval by the computing device.

Referring to FIG. 3, FIG. 5 and FIG. 6, as long as power is continued to be supplied to the scanner (e.g., when the USB socket 424 is connected to a computing device or an external power supply via a USE cable), the base portion 351 of the cover plate 35 can be pivoted, along with the support member 34, to the supporting position so as to expose the adaptor 5 for direct electrical connection with the connecting socket 62 of the electronic device 6. While software is preinstalled in the electronic device 6 to enable communication between the scanner and the electronic device 6, the scanner may be operated to begin an image scan by operating the scan operator 425 on the scanner or by touching a scan icon displayed on the display panel 61 of the electronic device 6 and associated with the image scan operation of the scanner. The scanned data may be directly displayed on the display panel 61 for a user to view and determine whether the scanned data is satisfactory. As compared with the prior art, the scanner of the present invention can be connected directly to a portable electronic device 6 without requiring a connecting cable or a wire, thereby being more convenient to use.

It should be noted herein that the electronic device 6 in this embodiment is a tablet computer with a battery module. Therefore, when the electronic device 6 is connected to the scanner via the adaptor 5, the battery module thereof may be charged by the power supply module 44 of the scanner. As such, the present invention further facilitates charging of the electronic device 6 in addition to being capable of connecting to the electronic device 6 without requiring a connecting cable or a wire.

Figure 7:
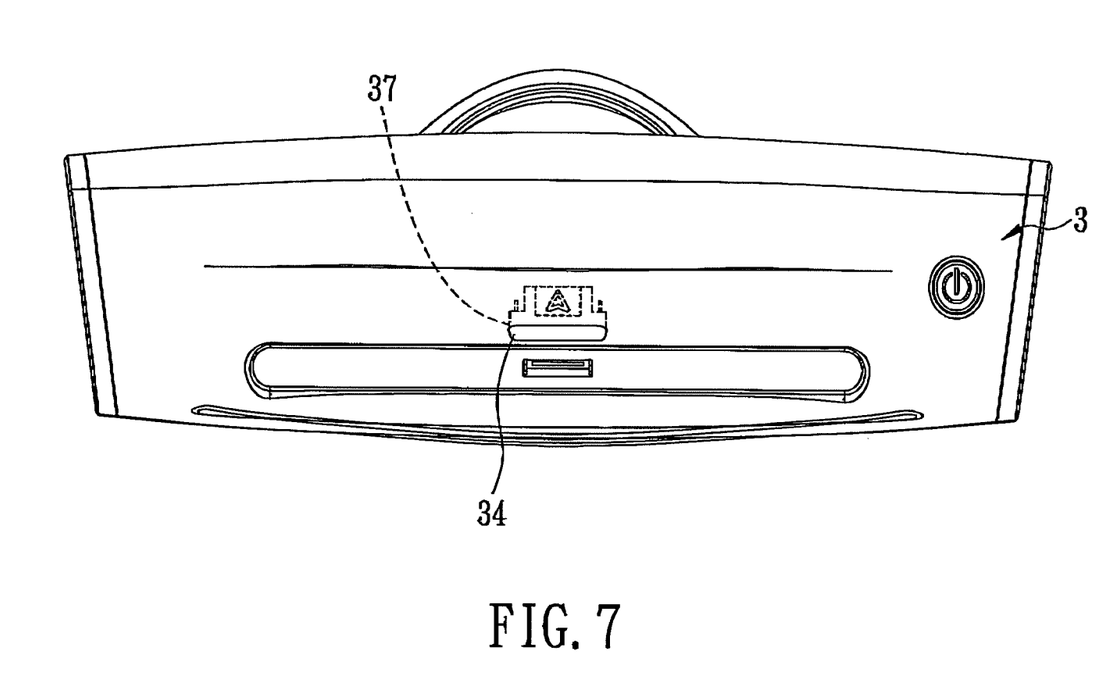
FIG. 7 is a top view of the second preferred embodiment of a scanner according to the present invention.
Figure 8:
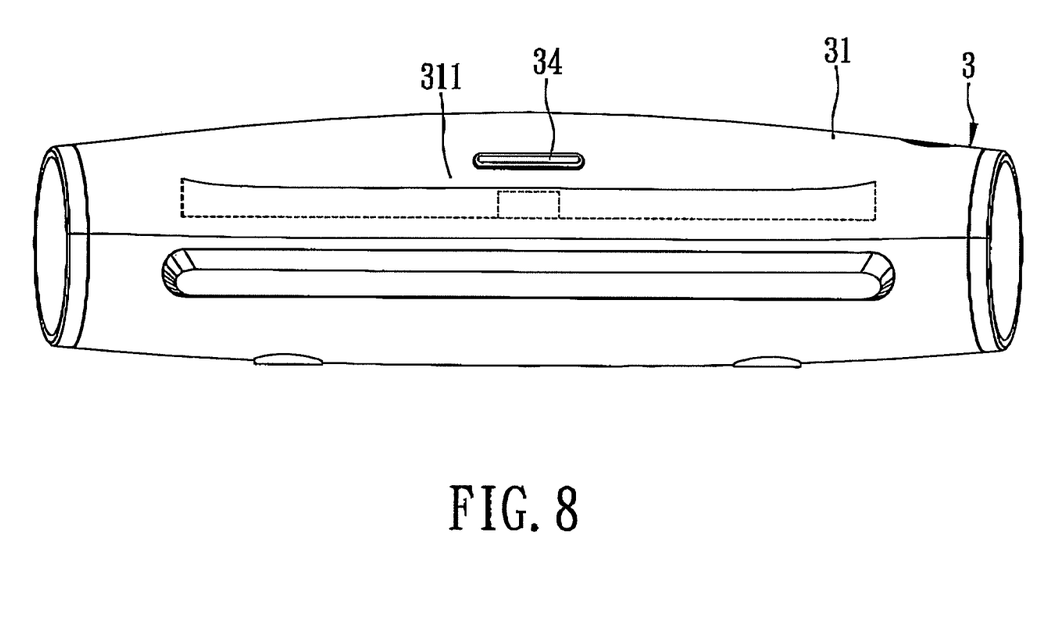
FIG. 8 is a front view of the scanner according to the second preferred embodiment.
Figure 9:
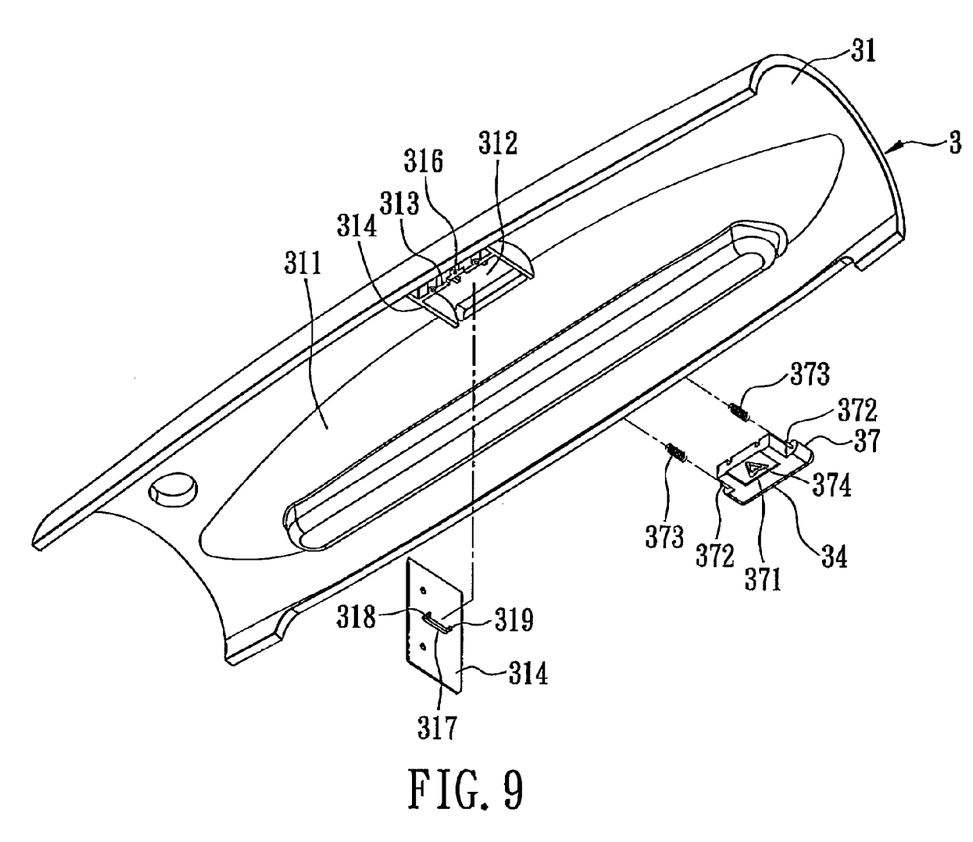
FIG. 9 is a fragmentary exploded perspective view of an upper housing of the scanner according to the second preferred embodiment.

With reference to FIG. 7, FIG. 8 and FIG. 9, the second preferred embodiment of a scanner according to the present invention is similar to the first preferred embodiment, and only the aspects of the second preferred embodiment differing from the first preferred embodiment will be described in the following description.

In the second preferred embodiment, unlike the first preferred embodiment, there is no cover plate 35 (as shown in FIG. 2) at the upper housing 3.

The upper housing 3 further includes a slide member 37 connected to the support member 34. The slide member 37 includes a main body portion 371 that is connected at one side to the support member 34, a resilient unit that abuts resiliently against another side of the main body portion 371 opposite to the support member 34, and a guide track 374 that is formed in the main body portion 371. In this embodiment, the slide member 37 further includes two insert poles 372 extending at said another side of the main body portion 371 away from the support member 37, and the resilient unit includes two spring members 373 respectively sleeved on the insert poles 372 and abutting resiliently against said another side of the main body portion 371.

Figure 10:
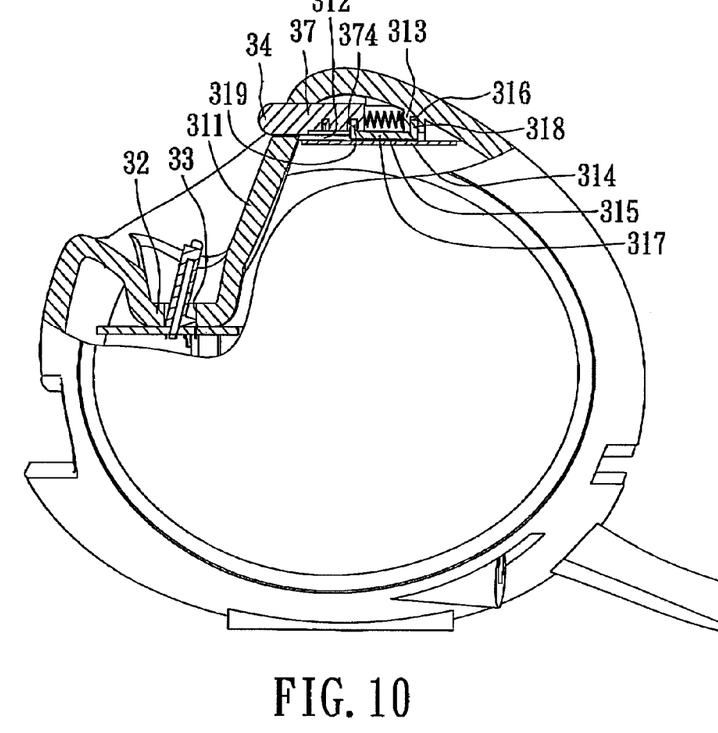
FIG. 10 is a partly sectional view of the scanner according to the second preferred embodiment.

Referring to FIG. 8, FIG. 9 and FIG. 10, the upper wall 31 of the main body of the upper housing 3 includes an inclined portion 311 proximate to the recess wall 32, a sliding groove portion 312 provided in the inclined wall 311 for accommodating movable extension of the slide member 37 therein, upper and lower groove-defining wall portions 313, 314 cooperatively defining the sliding groove portion 312, and a guide member 315 disposed on the lower groove-defining wall portion 314 and received movably in the guide track 374 for limiting the movable extension of the slide member 37 in the sliding groove portion 312.

The upper groove-defining wall portion 313 has an insert hole 316. The guide member 315 has a first insert portion 318 received in the insert hole 316, a second insert portion 319 received movably in the guide track 374 that is formed in the main body portion 371 of the slide member 37; and a connecting portion 317 connecting the first and second insert portions 318, 319 and disposed in slidable contact with the lower groove-defining wall portion 314.

The slide member 37, along with the support member 34, is movable relative to the sliding groove portion 312 between a first position and a second position.

Figure 11:
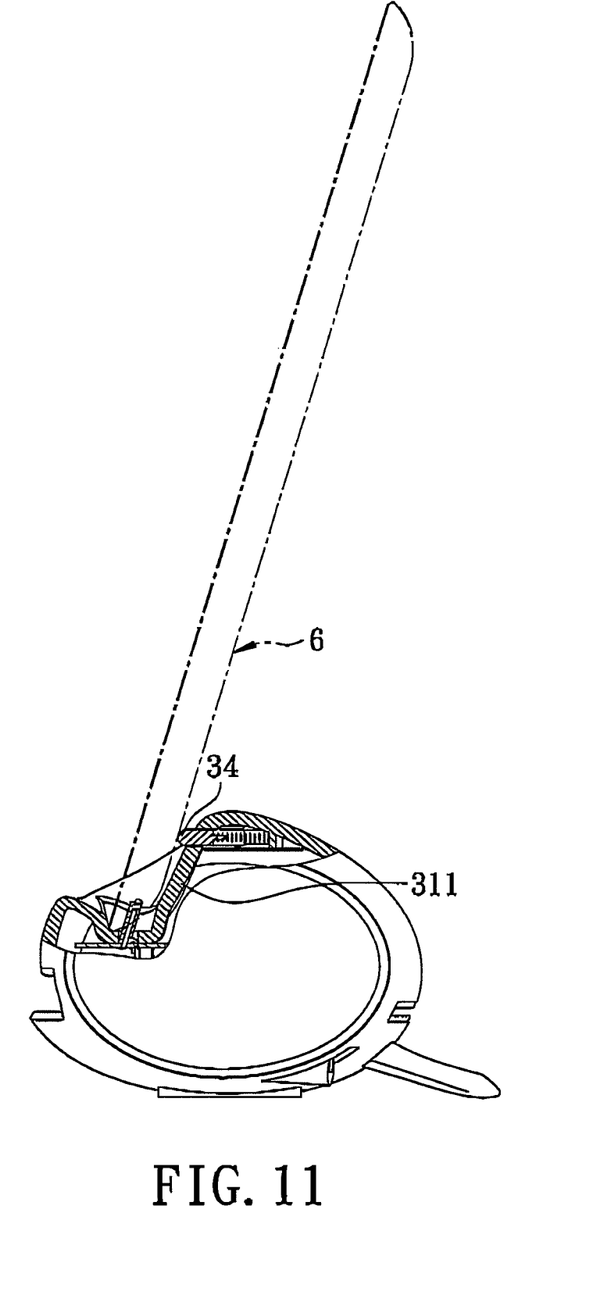
FIG. 11 is a partly sectional view of the scanner connected to an electronic device according to the second preferred embodiment when a slide member is disposed at a first position.
Figure 12:
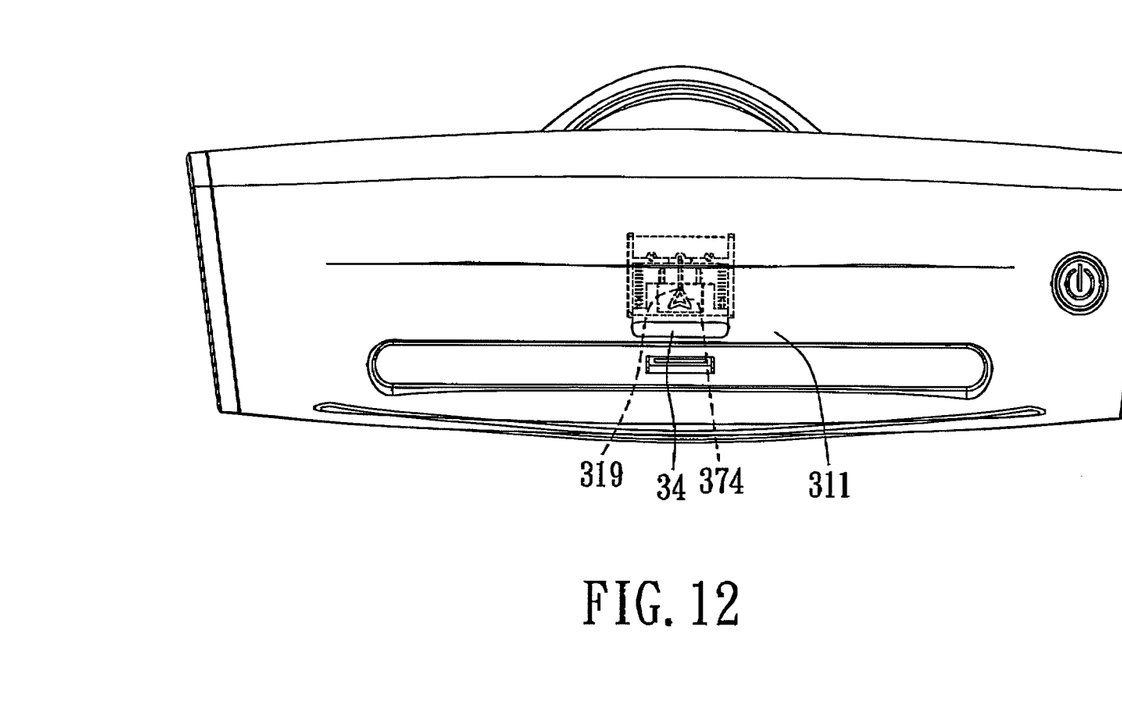
FIG. 12 is a top view of the scanner according to the second preferred embodiment, illustrating that the slide member and a support member are disposed at the first position.

With reference to FIG. 11 and FIG. 12, when the slide member 37 is disposed at the first position, the second insert portion 319 of the guide member 315 is disposed at an end of the guide track 374 relatively distal from the support member 34, such that the support member 34 extends protrudingly from the inclined portion 311 of the upper wall 31 for supporting an electronic device 6 that has a smaller thickness when the electronic device 6 is connected directly to the adaptor 5.

Figure 13:
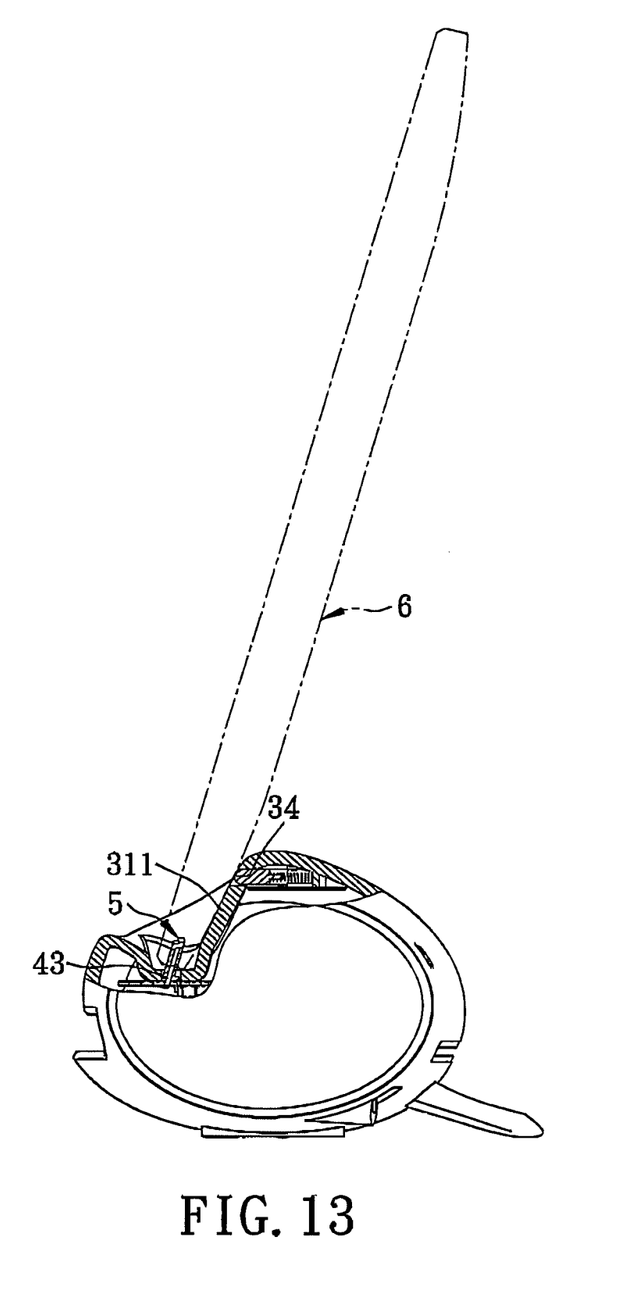
FIG. 13 is a partly sectional view of the scanner connected to the electronic device according to the second preferred embodiment when the slide member is disposed at a second position.
Figure 14:
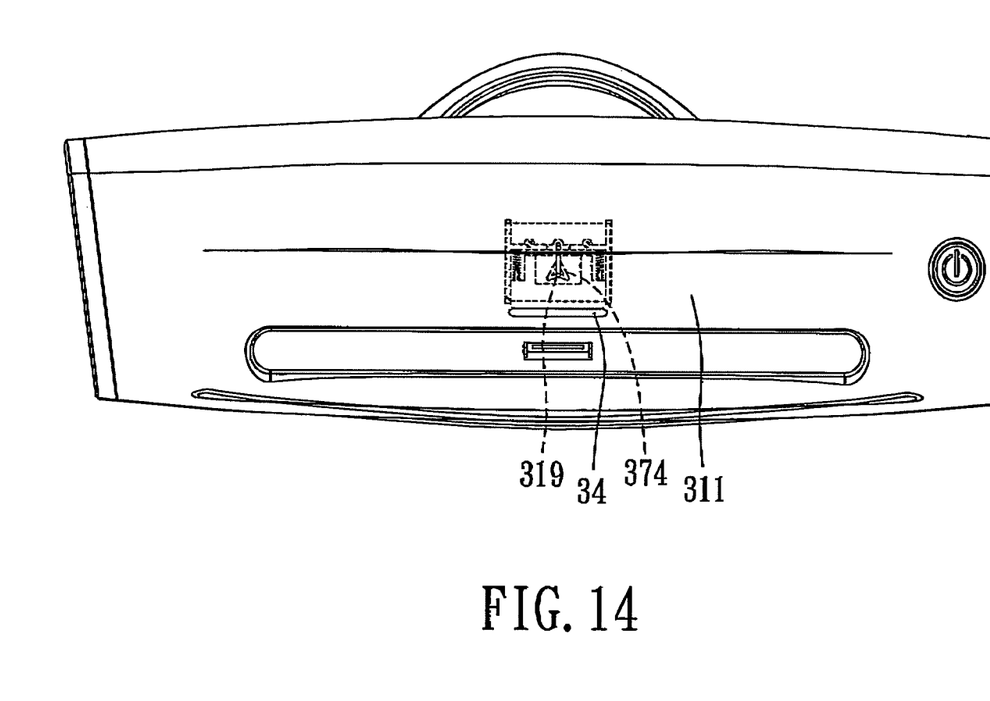
FIG. 14 is a top view of the scanner according to the second preferred embodiment, illustrating that the slide member and the support member are disposed at the second position.

With reference to FIG. 13 and FIG. 14, when the slide member 37 is disposed at the second position, the second insert portion 319 of the guide member 315 is disposed at another end of the guide track 374 relatively proximate to the support member 34, such that the support member 34 is flush with the inclined portion 311 of the upper wall 31, thereby allowing both the inclined portion 311 and the support member 34 to provide support to an electronic device 6 that has a greater thickness when the electronic device 6 is connected directly to the adaptor 5.

As such, the second preferred embodiment can also achieve the same object and advantages as with the first preferred embodiment. In addition, by allowing the position of the support member 34 to be adjustable, the second preferred embodiment is further able to provide stable support to electronic devices 6 with varying thicknesses.

In summary, with the provision of the connecting terminal 43 and the adaptor 5, a user can directly connect an electronic device 6 to the scanner of the present invention without using a connecting cable or a wire such that the scanner may be operated with ease and convenience. The scanned data generated by the scanner can then be displayed on the electronic device 6 for viewing by the user.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A scanner adapted to be connected to an electronic device having image display functionality, said scanner comprising:
    a lower housing formed on opposite sides with a paper inlet and a paper outlet;
    an upper housing mounted on said lower housing, and including a main body that is provided with a terminal hole, and a support member that is disposed proximate to said terminal hole and that is adapted to abut against the electronic device when the electronic device is connected to the scanner;
    a scan unit including a scan module that is disposed between said lower and upper housings, a control module that is coupled electrically to said scan module, and a connecting terminal that is coupled electrically to said control module and that is accessible via said terminal hole; and
    an adaptor removably mounted to said connecting terminal so as to permit direct electrical connection between said scanner and the electronic device such that said scanner may operate under control of the electronic device.

2. The scanner as claimed in claim 1, wherein said main body of said upper housing includes an upper wall disposed on an upper edge of said lower housing, and a recess wall extending concavely from said upper wall, said terminal hole being formed in said recess wall.

3. The scanner as claimed in claim 2, wherein said control module includes a computing chip coupled electrically to said scan module, and an internal memory coupled electrically to said computing chip.

4. scanner as claimed in claim 3, wherein said control module further includes a universal serial bus (USB) socket connected to said computing chip for permitting electrical connection between said scanner and an electronic device via a USB connector and/or for receiving external power through a USB connector, and said scan module further includes a power supply module coupled electrically to said computing chip, said USB socket and said connecting terminal.

5. The scanner as claimed in claim 4, wherein said power supply module includes a first voltage converter coupled electrically to said computing chip and said USB socket, and a second voltage converter coupled electrically between said connecting terminal and said first voltage converter.

6. scanner as claimed in claim 2, wherein said recess wall of said main body of said upper housing includes a side portion extending downwardly from said upper wall, and a bottom portion connected to a lower end of said side portion and formed with said terminal hole, said upper housing further including a cover plate that is mounted pivotally to said side portion of said recess wall for cooperatively defining a dustproof space with said recess wall when said cover plate is pivoted to cover said bottom portion of said recess wall.

7. The scanner as claimed in claim 6, wherein said support member is connected to said cover plate opposite to pivotal connection with said side portion of said recess wall, defines cooperatively said dustproof space with said cover plate and said recess wall, and is adapted to support the electronic device when said cover plate is pivoted to uncover said bottom portion of said recess wall.

8. The scanner as claimed in claim 2, wherein said upper housing further includes a slide member connected to said support member, said upper wall of said main body of said upper housing including an inclined portion that is proximate to said recess wall and a sliding groove portion that is provided in said inclined wall for accommodating movable extension of said slide member therein.

9. The scanner as claimed in claim 8, wherein said upper wall of said main body of said upper housing further includes upper and lower groove-defining wall portions cooperatively defining said sliding groove portion, said slide member including a main body portion that is connected at one side to said support member, a resilient unit that abuts resiliently against another side of said main body portion opposite to said support member, and a guide track that is formed in said main body portion, said upper wall of said main body of said upper housing further including a guide member that is disposed on said lower groove-defining wall portion and that is received movably in said guide track for limiting the movable extension of said slide member in said sliding groove portion.

10. The scanner as claimed in claim 9, wherein said slide member further includes two insert poles extending at said another side of said main body portion away from said support member, said resilient unit of said slide member including two spring members that are respectively sleeved on said insert poles and that abut resiliently against said another side of said main body portion.

11. The scanner as claimed in claim 9, wherein said upper groove-defining wall portion has an insert hole, said guide member having a first insert portion that is received in said insert hole, a second insert portion that is received movably in said guide track, and a connecting portion that connects said first and second insert portions and that is disposed in slidable contact with said lower groove-defining wall portion.

* * * * *